Patented July 3, 1928.

1,676,166

UNITED STATES PATENT OFFICE.

LOUIS SOKOLSKY, OF CHICAGO, ILLINOIS, ASSIGNOR TO ALBERT K. EPSTEIN, OF CHICAGO, ILLINOIS.

FOOD-PRODUCING PROCESS AND IMPROVED PRODUCT PRODUCED THEREBY.

No Drawing. Application filed December 29, 1924. Serial No. 758,578.

My invention relates to a process of providing a new food product and an improved product produced thereby, being directed more particularly to that class of food products containing a casein base produced preferably from skimmed milk, an object being to provide a process and improved food product in which the casein may be employed, but in which ingredients are supplied to increase the nutritional value.

The product is one which has advantages over the ordinary cottage cheese which also contains casein, in that it is more palatable, has a greater nutritional value, may be put up in firm cakes which retain their shape to better advantage under adverse climatic and temperature conditions, and may therefore be in better condition for shipping etc.

More particularly, my product consists of a purified casein combined with cocoanut oil, and the addition of such condiments, including salt, as may be desired.

In practising the process, I first prepare casein by clotting skimmed milk by means of lactic acid bacteria or rennet, or both bacteria and rennet, which casein is heated to a suitable temperature of approximately ninety degrees Fahrenheit and sufficient to coagulate the coagulable protein material and separate it from the whey. The whey is then drained off, after which it is purified by washing the coagulated curd or casein with water several times or sufficiently to remove the residual bacteria and undesirable milk constituents which were formed during the fermentation process and which were imbibed by the casein or spongy while curdy mass.

This casein or spongy white curdy mass will still contain a considerable amount of moisture and it is then subjected to a suitable pressing process to remove the surplus moisture, but only to a point where the product is still wet enough by the moisture absorbed in the protein material to make the particles adhere to each other.

I now take this wet casein and commingle it with a fluid cocoanut oil, which has a melting point of seventy-six degrees Fahrenheit, by a process to bring the oil particles into intimate contact with the casein particles and produce a resulting product which can be molded into loaves or other desired shapes and so retained.

More particularly, as an illustration of my process, I take about eighty pounds of the washed purified casein and place it in a suitable machine where it is pressed until the surplus fluid is removed, this pressing bringing the product down to about sixty pounds, and is what is referred to as wet casein. This final weight, however, may vary depending upon the condition of the casein, but it is left wet enough so that the constituent parts will adhere.

I now place the pressed wet casein in a vat where it is disintegrated in a suitable way, preferably by the use of paddles moving through the mass, until it is brought to a comminuted state. During this process of disintegration I apply melted natural cocoanut oil, preferably at a temperature of around eighty degrees Fahrenheit, and so that the oil will readily flow, adding about twenty-five to thirty pounds, which is thoroughly commingled with the disintegrated casein by means of the paddles or other mixing apparatus employed. Of course, the amount of cocoanut oil to be added may be varied, but I find the above proportions work out very satisfactorily.

I now take the commingled casein and cocoanut oil and transfer it to a suitable machine where it is more thoroughly mixed and for this purpose I find an ordinary rotary meat chopper of the screw type very satisfactory.

The product after being removed from the meat chopper is cooled so that the oil and casein constituents harden, and to this end I subject it to a chilling temperature for from six to eight hours. This period of time, however, may vary depending upon the temperature and degree of hardness desired. In this chilling step, I preferably use a temperature just above freezing so that the product, which still contains water, will not freeze.

The hardened product is now in a state of conglomerated hard particles and these particles and their constituents are further reduced to a macerated state, that is to a soft mass, by a further process of disintegration by again passing it through a suitable apparatus such as a rotary meat chopping machine. The product being in its hardened state is thus comminuted to a greater degree by this later step so as to bring the casein and hardened cocoanut oil into more intimate contact, and give it a finer and smoother texture.

The product after the last said operation is then molded into suitable forms, and to this end I have found it suitable to pass it into cloth bags as it leaves the last machine, this action forming the product into a suitable shape. The cloth bag may then be removed, leaving the product in a suitable loaf or other form after which it is wrapped in paper.

In order to put it in its best marketable form it is preferably boxed to hold its shape, then kept at a cold temperature of around thirty-five degrees Fahrenheit for several hours, the cooling temperature and time varying according to the size of the loaves. But I preferably keep the product from becoming frozen. This chilling or hardening operation permits better handling, also permits shipping to greater distances, holds its form better, and preserves it for edible purposes for a longer period of time.

As thus produced, the product will retain its shape under ordinary handling and also through temperatures which are not high enough to melt the cocoanut oil, that is below seventy-six degrees Fahrenheit, this being desirable so as to retain the product in its made form.

If desired, salt may be mixed or added to the product during the operation of disintegration.

What I claim as new and desire to secure by United States Letters Patent is:

1. As a new article of manufacture, a food product comprising chilled wet casein of skim milk and cocoanut oil comminuted and commingled and pressed into a homogeneous self-sustaining rigid mass.

2. The method of producing an article of food which consists in commingling wet casein and cocoanut oil by mixing the casein and oil while the latter is in a fluid state, then reducing the mixture while chilled to a comminuted state, and then solidifying the comminuted material into a self-sustaining form.

3. The method of producing an article of food which consists in commingling wet casein and cocoanut oil by mixing the casein and oil while the latter is in a fluid state, then reducing the mixture to a comminuted state, then chilling and again comminuting the chilled mixture, and then solidifying the comminuted material into a self-sustaining shape.

4. The method of producing a food product which consists of commingling casein and fluid cocoanut oil by mixing together, then chilling at a low temperature until the mass becomes hard but without freezing the mass, and then comminuting the mixture into a macerated state.

5. The method of producing a food product which consists of commingling casein and fluid cocoanut oil by mixing together, then chilling at a low temperature until the mass becomes hard but without freezing the mass, then comminuting the mixture into a macerated state, and then shaping the mixture into solidified marketable forms.

In witness whereof I hereunto subscribe my name this 12th day of December, 1924.

LOUIS SOKOLSKY.